United States Patent

Yamamoto et al.

[11] Patent Number: 5,311,935
[45] Date of Patent: May 17, 1994

[54] CORRUGATED FIN TYPE HEAT EXCHANGER

[75] Inventors: Michiyasu Yamamoto, Chiryu; Mikio Fukuoka, Bisai, both of Japan

[73] Assignee: Nippondenso Co., Ltd., Kariya, Japan

[21] Appl. No.: 2,832

[22] Filed: Jan. 15, 1993

[30] Foreign Application Priority Data

Jan. 17, 1992 [JP] Japan ............................ 4-006524

[51] Int. Cl.⁵ .......................................... F28D 1/053
[52] U.S. Cl. .................................. 165/152; 165/153
[58] Field of Search .............................. 165/152, 153

[56] References Cited

U.S. PATENT DOCUMENTS

| | | | |
|---|---|---|---|
| 4,332,293 | 6/1982 | Hiramatsu | 165/153 |
| 4,693,307 | 9/1987 | Scarselletta | 165/152 |
| 4,825,941 | 5/1989 | Hoshino et al. | 165/153 |
| 4,998,580 | 3/1991 | Guntly et al. | 165/133 |
| 5,033,540 | 7/1991 | Tategami et al. | 165/153 |
| 5,076,354 | 12/1991 | Nishishita | 165/153 |

FOREIGN PATENT DOCUMENTS

| | | | |
|---|---|---|---|
| 107190 | 6/1984 | Japan | 165/152 |
| 59-107190 | 6/1984 | Japan | |
| 123996 | 5/1989 | Japan | 165/152 |
| 102193 | 4/1991 | Japan | 165/152 |
| 3204595 | 6/1991 | Japan | |
| 345302 | 7/1991 | Japan | |
| 3204595 | 9/1991 | Japan | |

Primary Examiner—John Rivell
Assistant Examiner—L. R. Leo
Attorney, Agent, or Firm—Cushman, Darby & Cushman

[57] ABSTRACT

A corrugated fin type heater core includes an inlet tank, an outlet tank, tubes and a corrugated fin. The corrugated fin has a cross section elongated in a direction parallel to the direction in which air flows to a region where heat exchange takes place. The corrugated fin is brazed to the tubes and has a multiplicity of louvers angled in the direction in which the air is introduced. The corrugated fin has a height Hf within the range of between 2.5 mm and 6.0 mm.

9 Claims, 11 Drawing Sheets

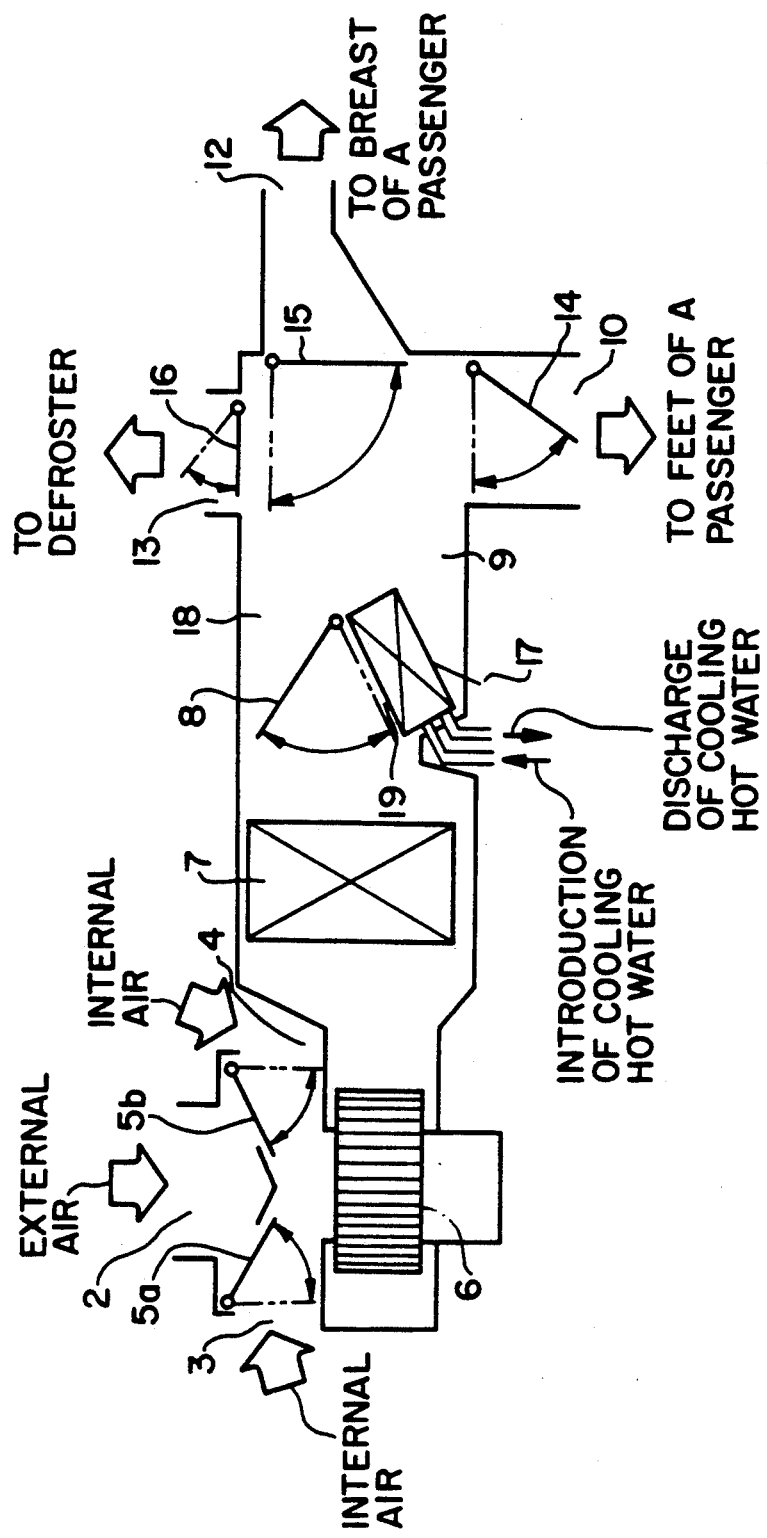

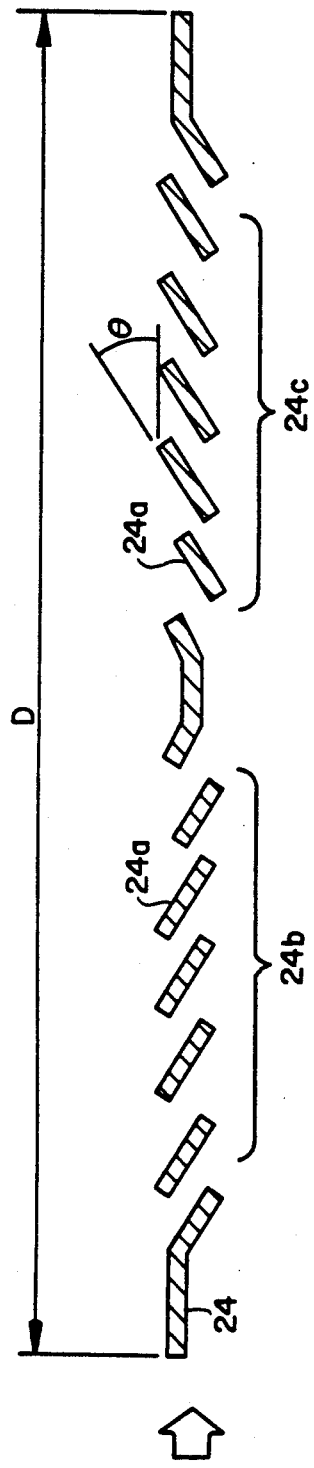
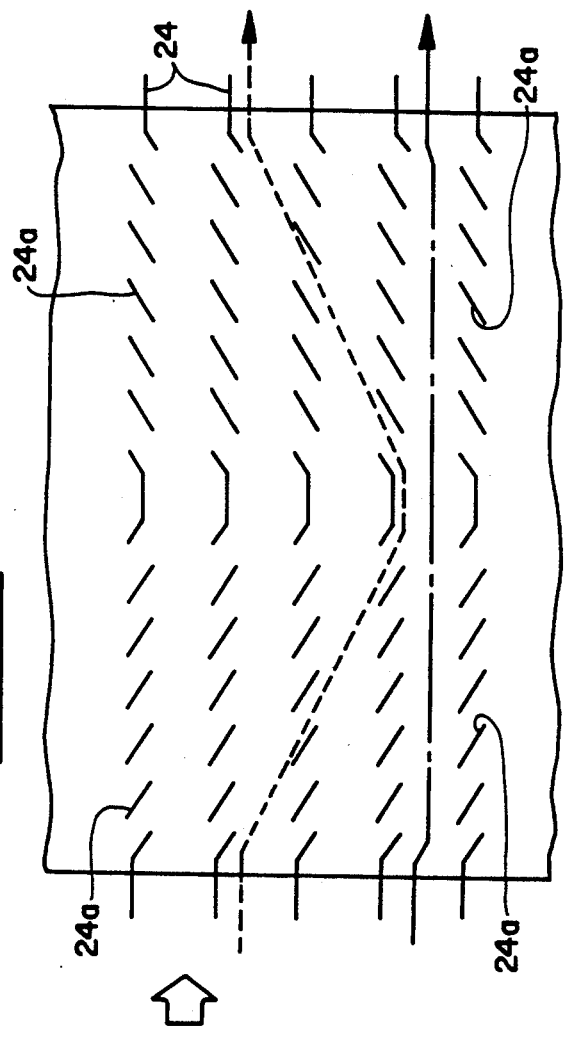
FIG. 4A
FIG. 4B

CORRUGATED FIN TYPE HEAT EXCHANGER

BACKGROUND OF THE INVENTION

1. Field of the Invention

The present invention relates to a corrugated fin type heat exchanger and is suitable for use, particularly, in an air-conditioner for an automobile.

2. Description of the Prior Art

A conventional corrugated fin type heat exchanger is described, for example, in Japanese laid-open utility model publication No. Heisei 2-109178. It discloses that a currugated fin preferably has a height within the range of between 6 mm and 12 mm when taking heat dissipation and resistance to airflow into consideration.

An air conditioning system with such a corrugated fin type heat exchanger tends to be more and more used in motor vehicles. Attempts have been made to improve such a vehicular air conditioning system. This brings about a substantial change in the flow characteristics of air and water. For example, maximum heat exchange efficiency in the conventional air conditioning system, when loaded in a motor vehicle, is slightly changed.

Generally, in a water flow system of a heater core for use in a vehicular air conditioning system, the amount of flowing hot water was determined based on a matching point of the flow resistance in an engine coolant circuit and the characteristic of a pump. FIG. 6 shows the matching point where two curves indicative of the flow resistance and the pump characteristic meet. Also, the flow of air was determined based on a matching point of the flow resistance to air in an air flow system, which is composed of a duct, a heater core, and an evaporator, and the characteristic of a fan. FIG. 7 shows the matching point where two curves indicative of the flow resistance and the fan characteristic meet.

The inventors have considered, through computer simulation, the amount of heat radiation determined by those two curves. Tubes are of the twin type shown in FIG. 8(a) and the single type shown in FIG. 8(b). As a result, it has been found that heat radiation is maximized when a fin has a height within a specific range. Parameter is a core depth D, and the height Hf of the fin is varied. It has also been found that specific range of the fin height Hf is independent of the thickness B of the tubes and the pitch Pf of the fin.

SUMMARY OF THE INVENTION

An object of the present invention is to provide a corrugated fin type heat exchanger designed to maximize heat exchange efficiency within the allowable range of flow characteristics of air and water.

To achieve the object, there is provided a corrugated fin type heat exchanger which comprises an inlet tank for receiving a fluid to be cooled and distributing the fluid to a plurality of flat tubes, a corrugated fin thermally connected to the flat tubes and cooperating with the flat tubes to provide a heat exchanging region for the fluid, and an outlet tank for collecting the fluid from the flat tubes and discharging the fluid, the flat tube having a cross section enlogated in a direction parallel to the direction in which air flows to the heat exchange region, wherein the corrugated fin includes a group of louvers angled in the direction in which the air is introduced. The corrugated fin has a height $Hf$ within the range of between 2.5 mm and 6.0 mm.

The flat tubes and the corrugated fin are made of pure aluminum or alluminum alloy. The height $Hf$ of the corrugated fin is within the range of between 3.0 mm and 6.0 mm.

The flat tubes and the corrugated fin are made of copper or brass. The height $Hf$ of the corrugated fin is within the range of between 2.5 mm and 5.5 mm.

It has been found that heat exchange by the fin is maximized particularly when the fin of the corrugated fin type heat exchanger has a height $Hf$ within the range of between 2.5 mm and 6.0 mm.

BRIEF DESCRIPTION OF THE DRAWINGS

FIG. 2 is a schematic view of one embodiment of the present invention as applied to a heater core of a vehicular air conditioning system;

FIG. 4(a) illustrates a single array of louvers;

FIG. 4(b) illustrates a plurality of arrays of louvers;

DESCRIPTION OF THE PREFERRED EMBODIMENTS

Figure 1:
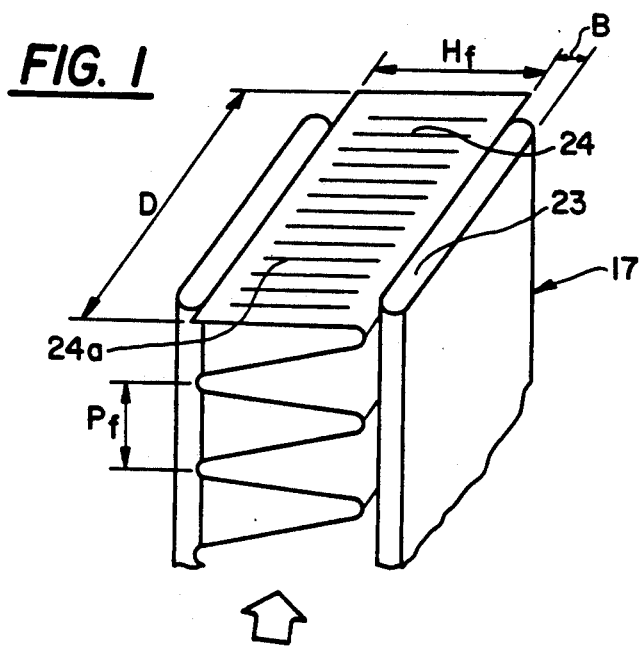
FIG. 1 is a perspective view showing the principal part of each of a flat tube and a corrugated fin.

FIGS. 1 to 5 show a heater core for use in a vehicular air conditioning system to which the present invention is applied. As shown in FIG. 2, an airflow system includes an external air inlet 2 through which air is introduced from the outside of a vehicle, and internal air inlets 3 and 4 through which air is introduced from within the compartment of the vehicle. Air flows in through either the external air inlet 2 or the internal air inlets 3 and 4 and is then directed to an evaporator 7 by an air fan 6. Dampers 5a and 5b are rotatably mounted to the internal air inlets 3 and 4, respectively to adjust the opening of the internal air inlets 3 and 4. An air mixing damper 8 is located at the outlet side of the evaporator 7 to define two passages, namely, a first passage 18 and a second passage 19. A heater core 17 is mounted in the second passage 19. An air mixing chamber 9 is defined at the outlet sides of the air mixing damper 8 and the heater core 17 so as to communicate with a defroster outlet 13, a breast outlet 12 and a foot outlet 10. Dampers 14, 15 and 16 are rotatably mounted to the outlets 10, 12 and 13, respectively to adjust the opening of these outlets 10, 12 and 13.

Figure 3:
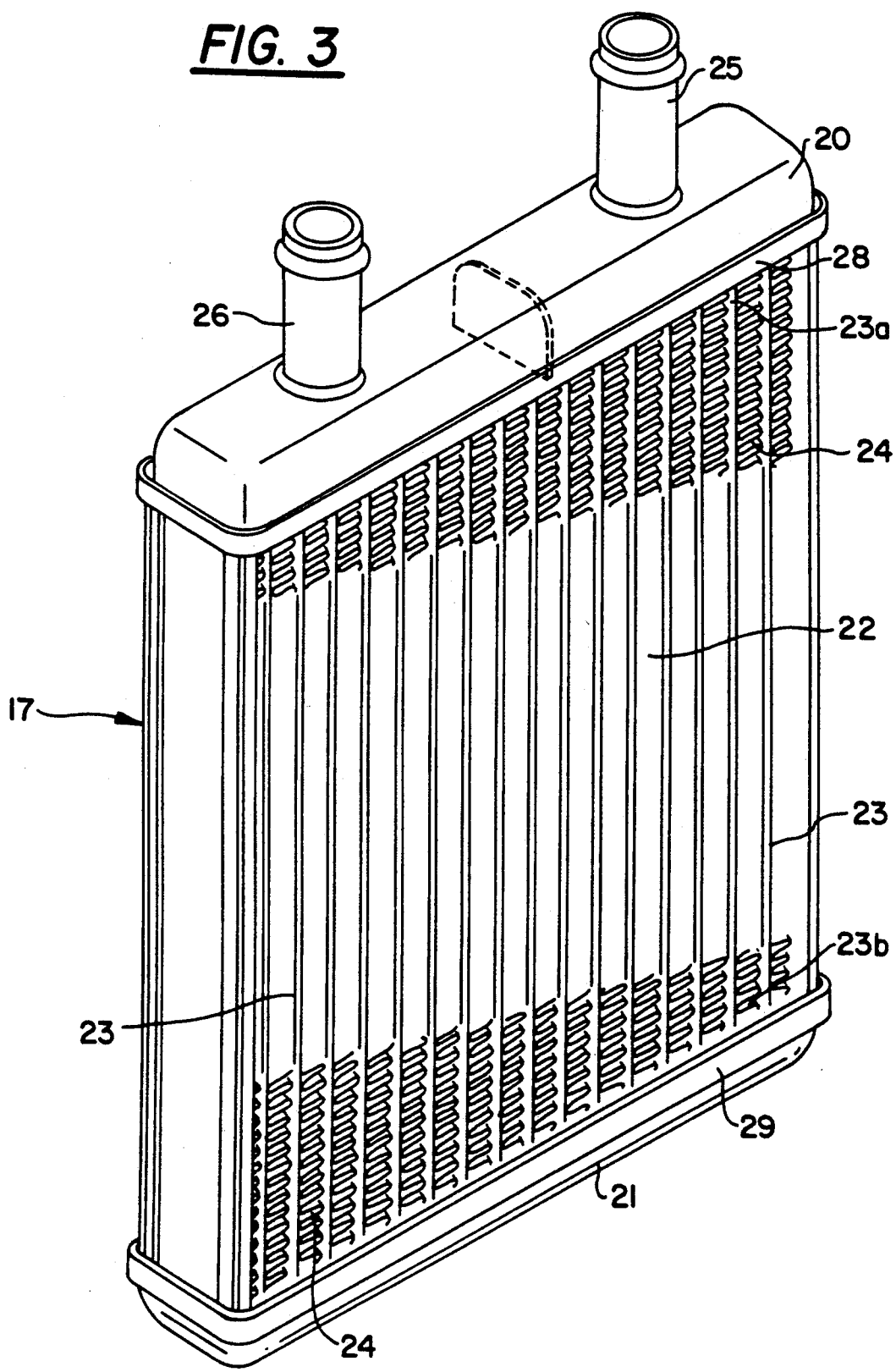
FIG. 3 is a perspective view of a heater core according to one embodiment of the present invention.
Figure 6:
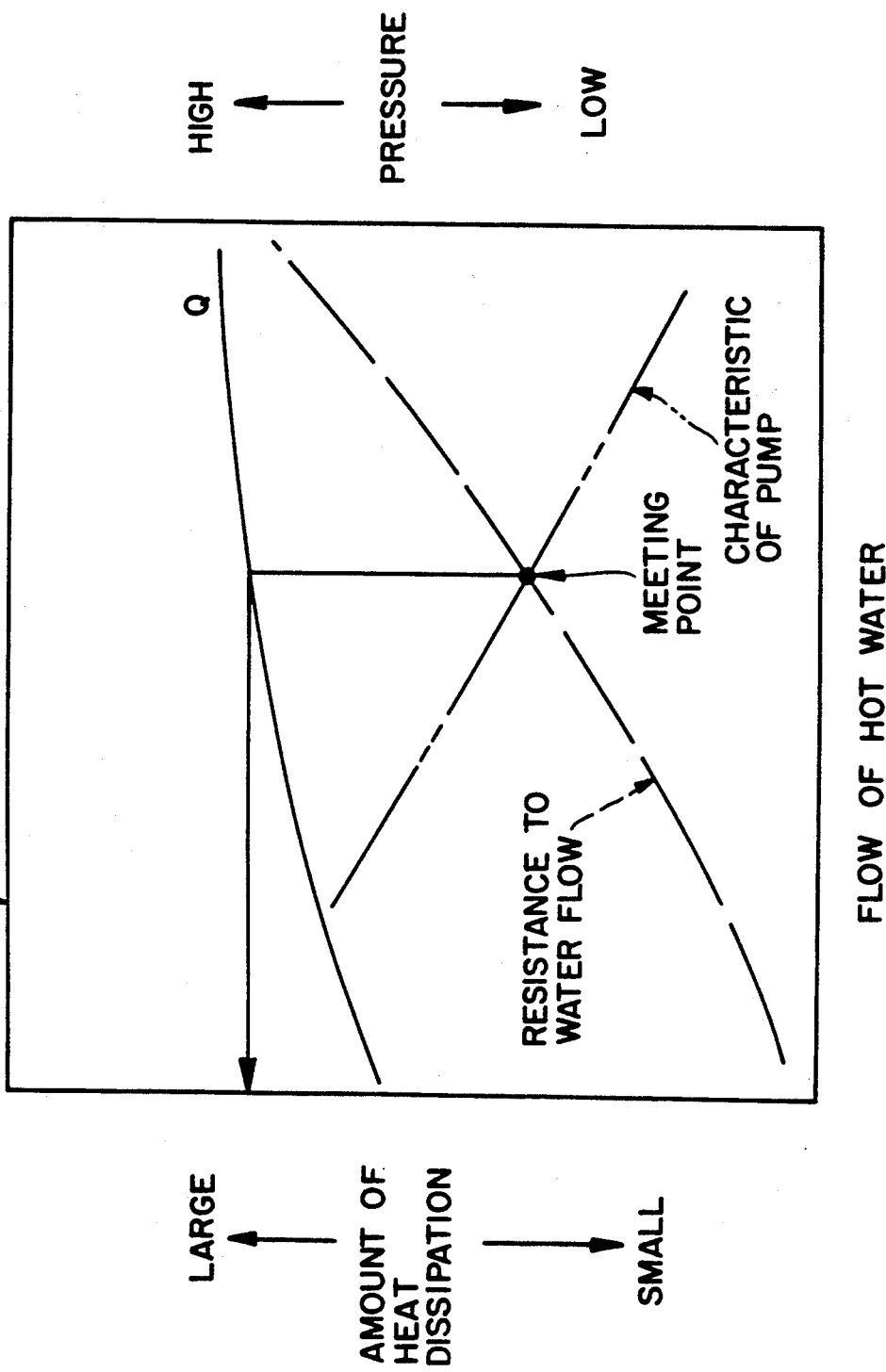
FIG. 6 illustrates the flow characteristic of hot water in the heater core.
Figure 7:
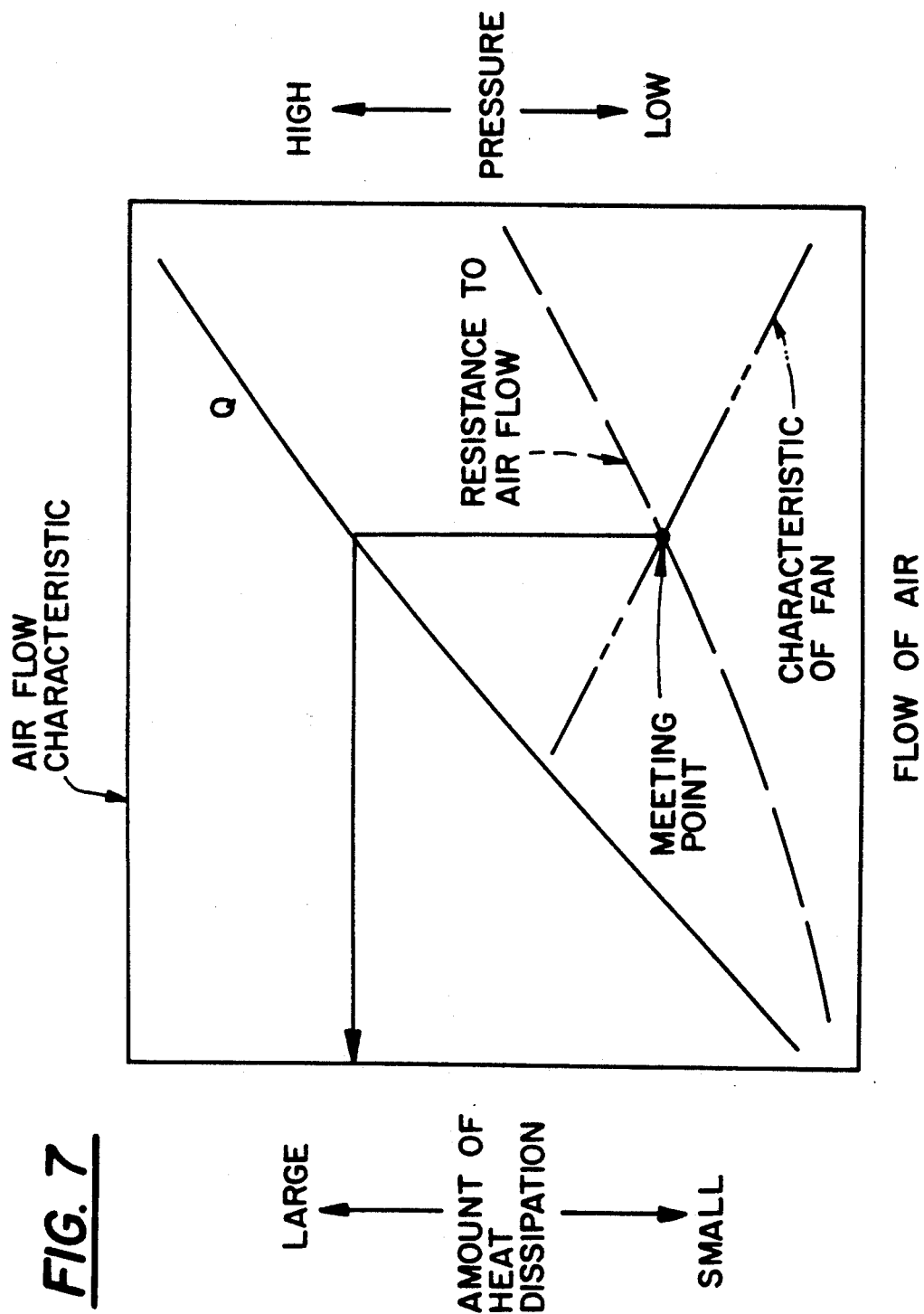
FIG. 7 illustrates the flow characteristic of air in the heater core.

As shown in FIG. 3, the heater core comprises an upper tank 20, a lower tank 21 and a core 22. The upper tank 20 and the lower tank 21 are each made of brass, aluminum, aluminum alloy or resin. The core 22 is made of copper, brass, aluminum or aluminum alloy. The core 22 includes a plurality of parallel tubes 23 through which the upper tank 20 and the lower tank 21 are communicated with each other, and a corrugated fin 24. Each tube 23 has an upper end 23a extending through a convexed guide (not shown) in a sheet metal 28 and opening to the interior of the upper tank 20. Similarly, the tube 23 has a lower end 23b extending through a convexed guide (not shown) in a sheet metal 29 and opening to the interior of the lower tank 21. The upper sheet metal 28 and the lower sheet metal 29 are welded or brazed to flanges of the upper and lower tanks, respectively.

Figure 5:
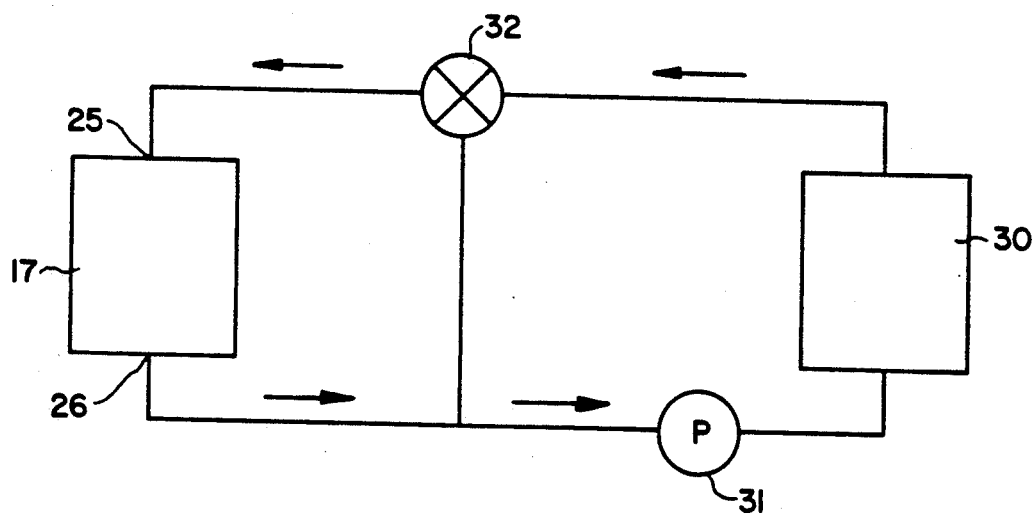
FIG. 5 is a schematic view showing the manner in which engine coolant is circulated from the heater core.

The upper tank 20 has an inlet pipe 25. This inlet pipe 25 and an outlet pipe 26 connected to the upper tank 20 form a part of a water flow system through which an engine coolant is circulated. In FIG. 5, numeral 30 represents an engine, numeral 31 represents a pump, and numeral 32 represents a flow switch valve.

As shown in FIG. 1, the tube 23 is flat and is made from an aluminum or aluminum alloy sheet of, for example, 0.4 mm in thickness. The flat tube 23 has a cross section longated in a direction parallel to a direction A in which air flows to the heater core 17 by the air fan 6. The corrugated fin 24 is wavy and is made from an aluminum or aluminum alloy sheet of, for example, 0.04 to 0.06 mm in thickness. As shown in FIG. 4, a plurality of louvers 24a are provided on the corrugated fin 24 and angled in the direction (arrow A) in which air flows. The louvers 24a are integral with the fin 24 and inclined at an angle of 15° to 30üï. A group of louvers have an upstream section 24b and a downstream section 24c. The louvers in the upstream section 24b and the louvers in the downstream section 24c are angled in opposite directions.

The flat tube 23 is cladded with a brazing material. Then, the corrugated fin 24 is assembled to the flat tube 23 by means of a suitable tool. The corrugated fin 24 and the flat tube 23 are heated in a suitable furnace. This fuses the brazing material to join the flat tube 23 and the corrugated fin 24 together.

The air flows between the louvers in a V-shaped manner to decrease the thickness of a boundary layer on the louvers and thus, to substantially improve thermal efficiency of the fin.

The inventors have found that heat dissipation is maximized when the corrugated fin has particular heights as will be explained hereinafter.

The inventors used computer simulation to see how much heat is radiated in the heater core shown in FIGS. 1, 3 and 4 when the height Hf of the fin, the depth D of the core, the pitch Pf of the fin, and the thickness B of the tube are varied.

EXAMPLE 1

(Core depth D is variable)

Figure 9:
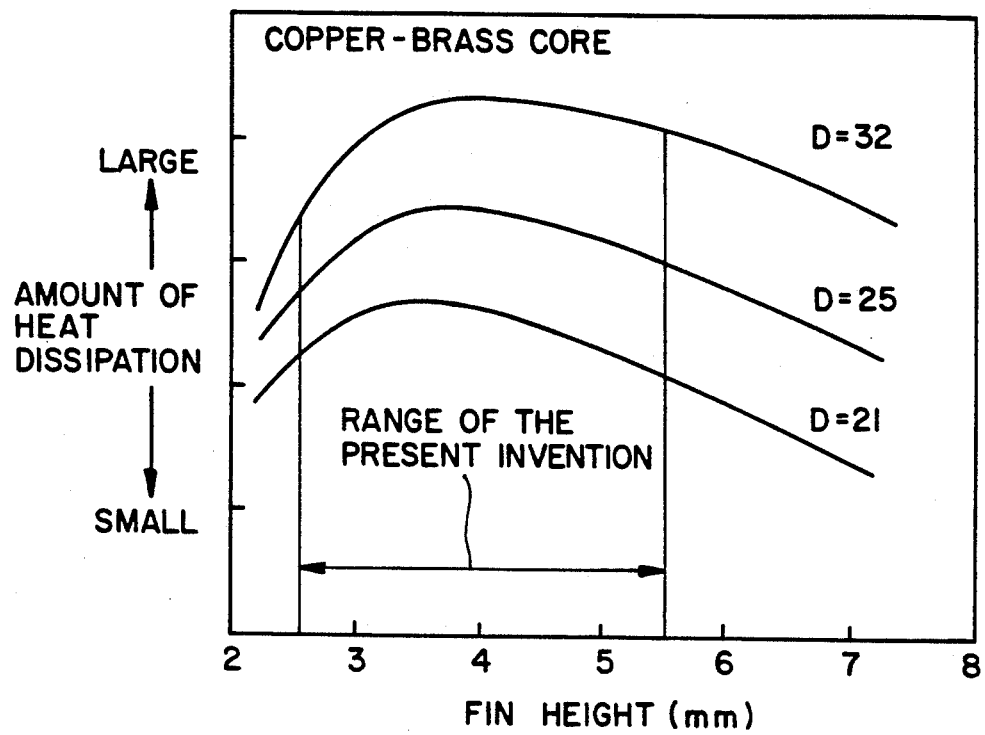
FIG. 9 is a graph showing the relationship between heat dissipation and the height $Hf$ of the fin and the depth D of the core made of copper-brass.
Figure 10:
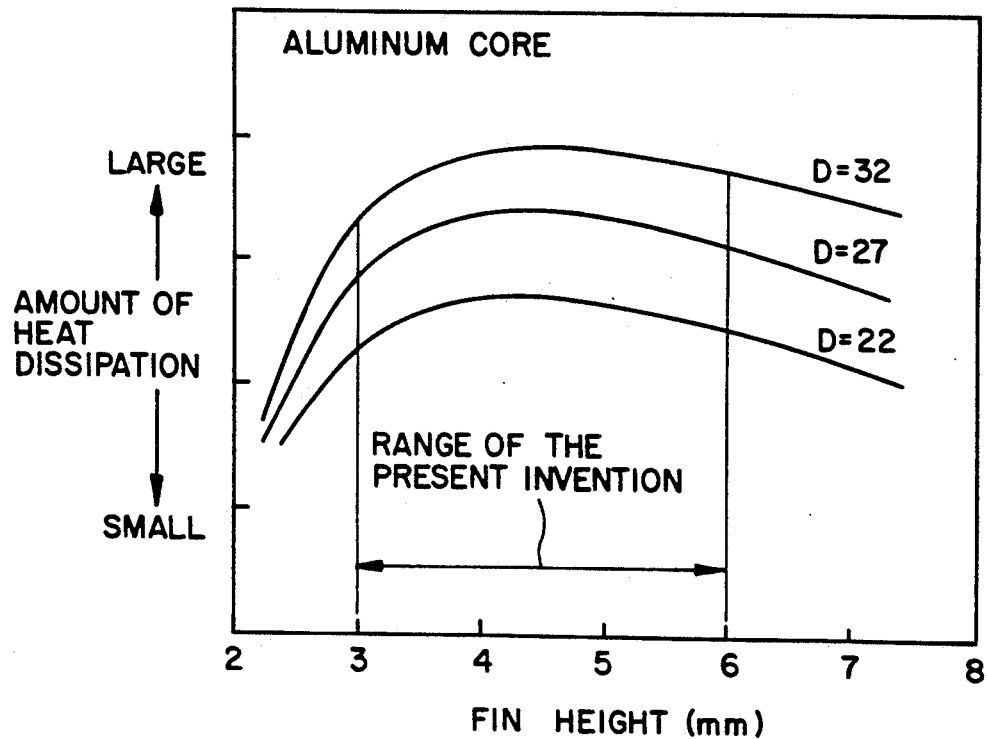
FIG. 10 is a graph showing the relationship between heat dissipation and the height $Hf$ of the fin and the depth D of the core made of aluminum.
Figure 11:
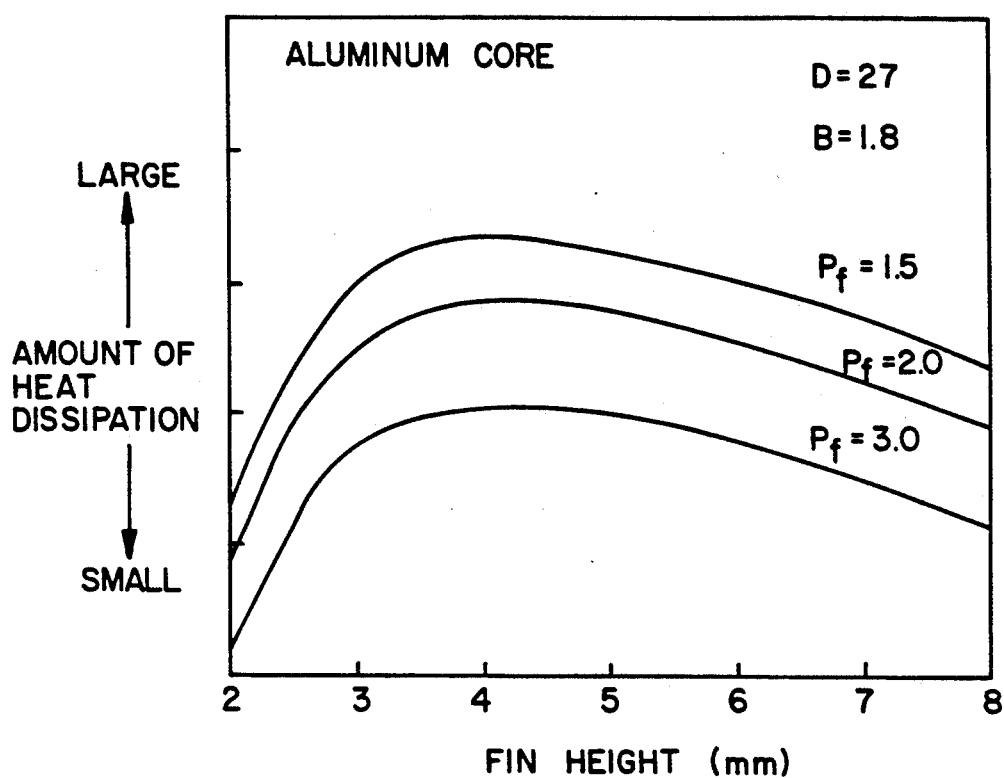
FIG. 11 is a graph showing the relationship between heat dissipation and the height $Hf$ and the pitch $Pf$ of the fin when the core is made of aluminum.

FIGS. 9 and 10 show the relationship between the height Hf of the corrugated fin and heat radiation.

Figure 8A:
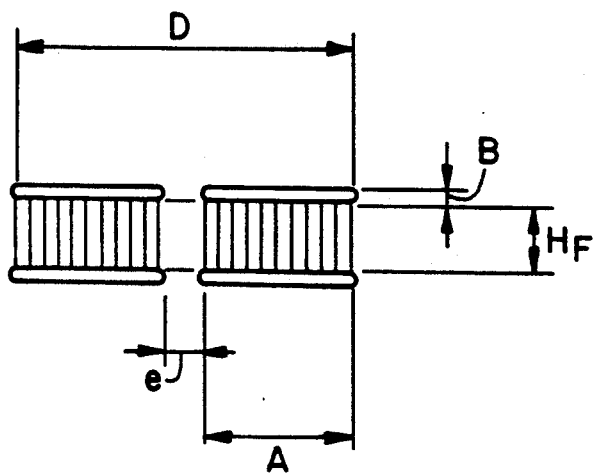
FIG. 8(a) is a schematic view of two arrays of tubes and a corrugated fin.

The core is made of copper-brass. The tube is of the twin type as shown in FIG. 8(a). The distance "e" between the tubes is 3 mm. The tube has a thickness B of 1.6 mm. The fin has a pitch Pf of 1.5 mm. The dimension of the front core is 160 mm×200 mm. The core has three different depths, 21 mm, 25 mm and 30 mm. As is clear from FIG. 9, it has been found that heat radiation is maximized when the fin has a height Hf within the range of between 2.5 mm and 5.5 mm. This result is independent of the depths of the core.

Figure 8B:
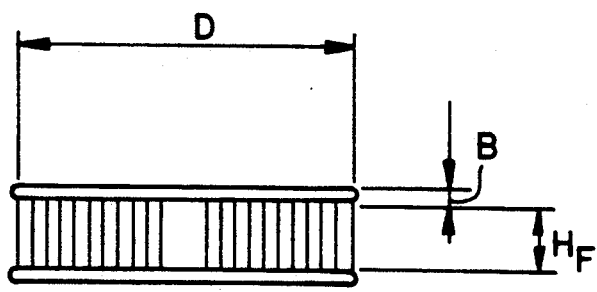
FIG. 8(b) is a schematic view of a single array of tube and a corrugated fin.

The core is made of aluminum, and the tube is of the single type shown in FIG. 8(b). The tube has a thickness B of 1.8 mm. The fin has a pitch Pf of 1.5 mm. The dimension of the front core is 160 mm×200 mm. The core has three different depths, 22 mm, 27 mm and 32 mm. As is clear from FIG. 10, it has been found that heat radiation is maximized when the fin has a height Hf within the range of between 3 mm and 6 mm. This result is independent of the depths of the core.

EXAMPLE 2

(Fin pitch Pf is variable)

The core is made of aluminum and has a depth D of 27 mm. The tube has a thickness B of 1.8 mm. The fin has three different pitches Pf, 1.5 mm, 2.5 mm and 3.0 mm. It has been found that heat radiation is maximized when the fin has a height Hf within the range of between 3 mm and 6 mm. This result is independent of the pitch of the fin.

EXAMPLE 3

(Tube thickness B is variable)

Figure 12:
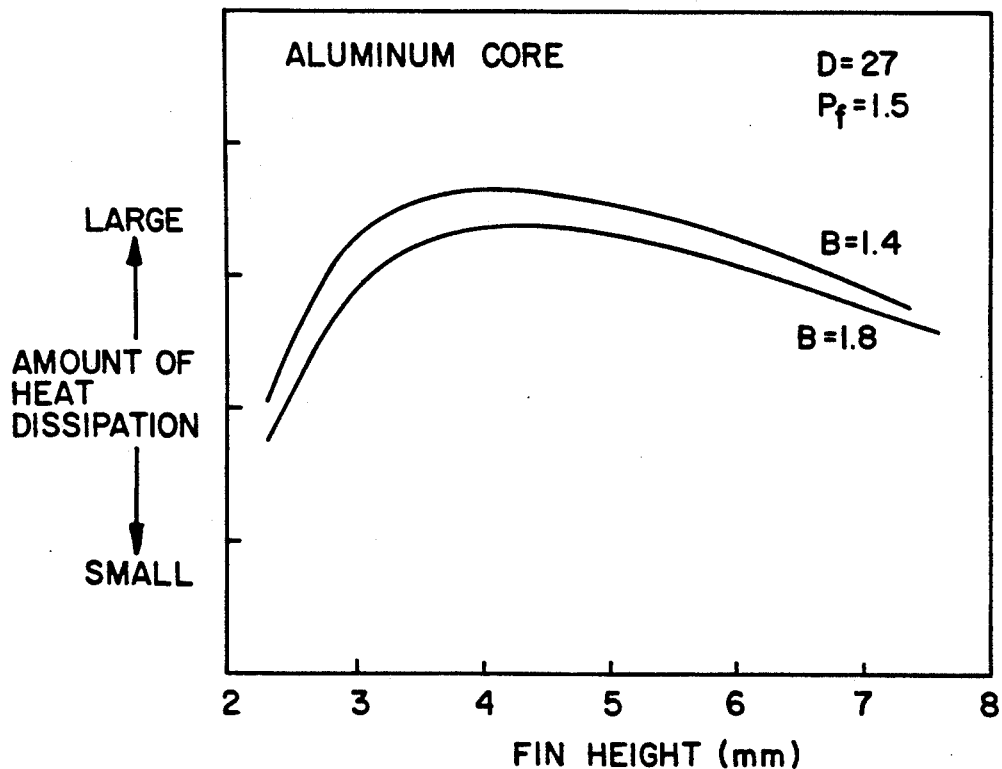
FIG. 12 is a graph showing the relationship between heat dissipation and the height $Hf$ of fin and the thickness B of the tubes when the core is made of aluminum.

The core is made of aluminum and has a depth D of 27 mm. The fin has a fixed pitch Pf of 1.5 mm. The tube has two different thicknesses, 1.4 mm and 1.8 mm. As is clear from FIG. 12, heat radiation is maximized when the fin has a height Hf within the range of between 3 mm and 6 mm. This result is independent of the thickness B of the tube.

Next, the fin has a fixed height Hf and a variable pitch Pf, and the tube has a variable thickness B.

EXAMPLE 4

(Fin height Hf is constant and tube thickness B is variable)

Figure 13:
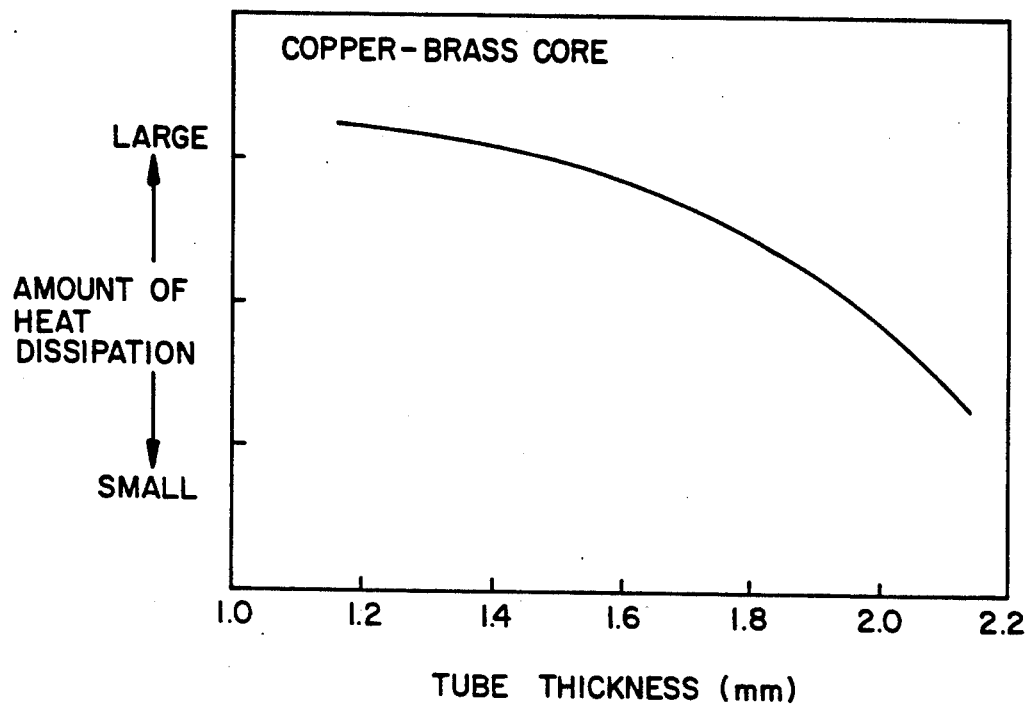
FIG. 13 is a graph showing the relationship between heat dissipation and the thickness B of the tubes when the core is made of copper-brass.

The tube is made of copper-brass and is of the twin type shown in FIG. 8(a). FIG. 13 shows the relationship between the thickness B of the tube and heat radiation. The core has a depth D of 25 mm. The fin has a height Hf of 4.7 mm. The tube has a length A of 11 mm. The dimension of the front core is 160 mm×200 mm. As is clear from FIG. 13, heat radiation decreases as the thickness B of the tube increases. This is partly because the area of the fin and the amount of air decreases as the thickness B of the tube increases when the core has a fixed front area.

Figure 14:
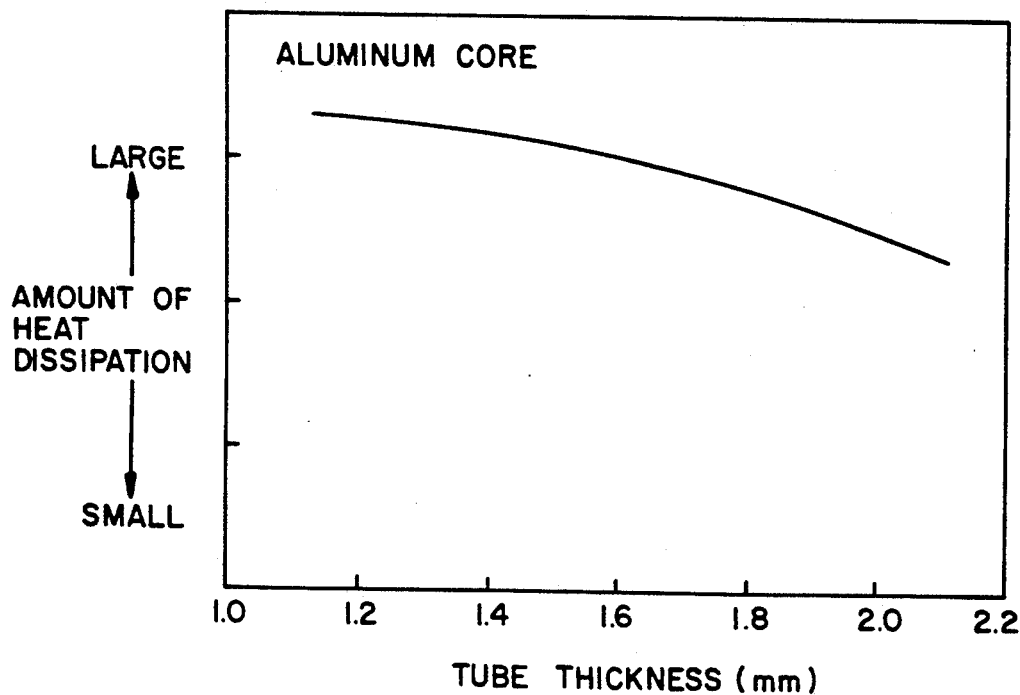
FIG. 14 is a graph showing the relationship between heat dissipation and the thickness B of the tubes when the core is made of aluminum.

The core is made of aluminum, and the tube is of the single type shown in FIG. 8(b). FIG. 14 shows the relationship between the thickness B of the tube and heat radiation. The core has a depth D of 27 mm. The fin has a height Hf of 4.5 mm. As in the copper-brass core, heat radiation gradually decreases as the thickness B of the tube gradually increases. This is partly because the fin area and the amount of air decreases as the thickness B of the tube increases when the core has a fixed front area.

EXAMPLE 5

(Fin height Hf is constant and fin pitch Pf is variable)

Figure 15:
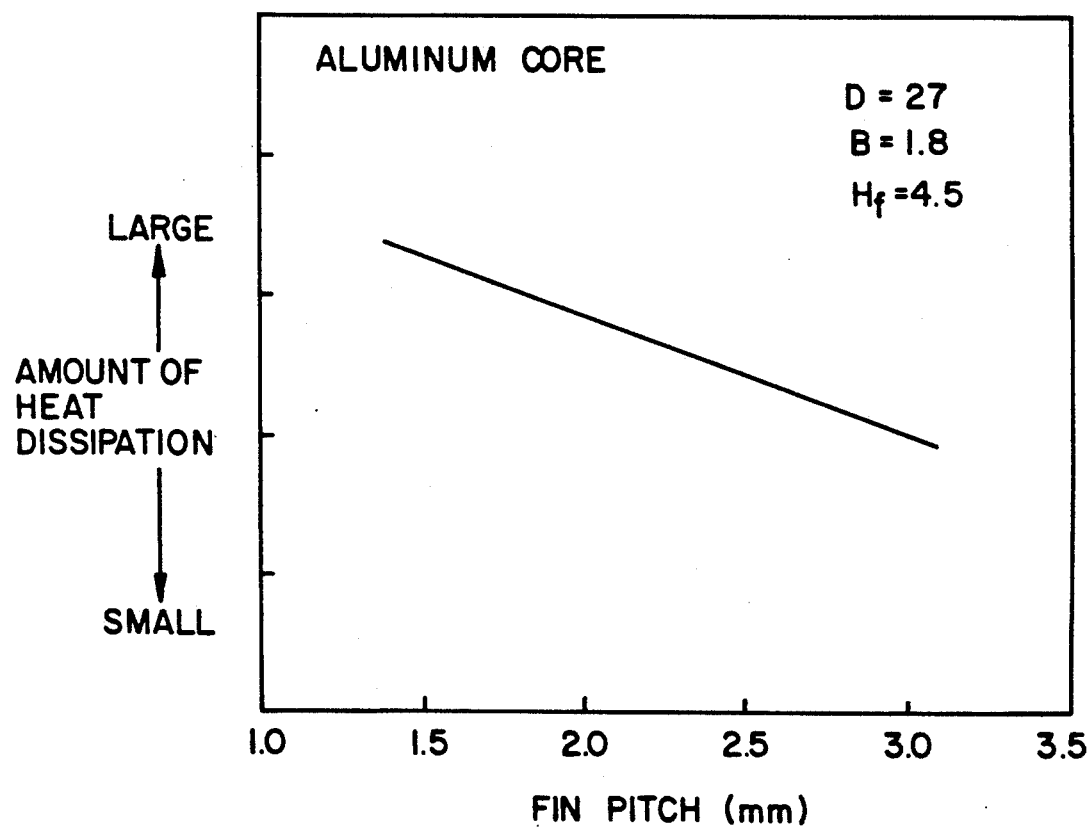
FIG. 15 is a graph showing the relationship between heat dissipation and the pitch $Pf$ of the fin when the core is made of aluminum.

The core used is made of aluminum and is of the single type shown in FIG. 8(b). FIG. 15 shows how heat radiation is varied depending on the pitch Pf of the fin. In this example, the core has a constant front area and has a depth D of 27 mm. The tube has a thickness B of 1.8 mm. The fin has a height Hf of 4.5 mm. The heat is less radiated when the pitch Pf of the fin is increased. This is partly because the area bewteen the fin and air where heat exchange takes place decreases as the fin pitch Pf increases.

In the above examples, the calculation is made based on variable fin height Hf, core depth D, fin pitch Pf and tube thickness B. It has been found that heat exchange can be maximized, and the heat exchanger can be made in more compact form when the height Hf of the corrugated fin is within the range of between 2.5 mm and 6 mm. This is the most important factor to substantially improve heat exchange capability of the fin. The other factors should be varied depending on the height of the fin.

In the illustrated embodiment, the present invention is applied to the heat core for use in a vehicular air conditioning system. Alternatively, it is applicable to a radiator for a domestic heater. It should be understood that the fluid is not limited to an engine coolant.

As described above, the corrugated fin type heat exchanger of the present invention maintains a V-shaped airflow between the louvers so as to maximize heat exchange efficiency when the height of the fin is within a specific range.

What is claimed is:

1. A corrugated fin type heater core for an automotive air conditioner, comprising:
    an inlet tank for receiving a fluid to be cooled;
    a plurality of flat tubes through which the fluid flows;
    a corrugated fin thermally connected to said flat tubes and cooperating with said flat tubes to radiate a heat of the fluid; and
    an outlet tank for collecting the fluid from said flat tubes and discharging the fluid therefrom,
    said flat tube having a cross section elongated in a direction parallel to the direction in which air flows thereto,
    said corrugated fin including a group of louvers angled in the direction in which the air is introduced, and
    said corrugated fin having a height Hf within the range of between 2.5 mm and less than 5.0 mm.

2. A corrugated fin type heater core according to claim 1, wherein said flat tubes and said corrugated fin are made of pure aluminum or alluminum alloy, and the height Hf of said corrugated fin is within the range of between 3.0 mm and less than 5.0 mm.

3. A corrugated fin type heater core according to claim 2, wherein the height Hf of said corrugated fin is preferably within the range of between 4.0 mm and less than 5.0 mm.

4. A corrugated fin type heater core according to claim 1, wherein said flat tubes and said corrugated fin are made of copper or brass.

5. A corrugated fin type heater core according to claim 1, wherein the fluid is an engine-coolant for an automobile.

6. A corrugated fin type heater core according to claim 5, wherein the air passed through the heat exchanger is introduced into a cabin of the automobile.

7. A corrugated fin type heater core according to claim 1, wherein the flat tubes are aligned in single row.

8. A corrugated fin type heater core according to claim 1, wherein the flat tubes are aligned in two rows.

9. A corrugated fin type heater core according to claim 1, wherein the height Hf of said corrugated fin is preferably about 4 mm.

* * * * *